(12) United States Patent
Jannotta (10) Patent No.: US 6,899,129 B2
(45) Date of Patent: May 31, 2005

(54) SHUTOFF VALVE AND RELATED METHODS

(76) Inventor: Louis J. Jannotta, 7940 Teton Rd., Orland Park, IL (US) 60462

(*) Notice: Subject to any disclaimer, the term of this patent is extended or adjusted under 35 U.S.C. 154(b) by 47 days.

(21) Appl. No.: 10/059,699

(22) Filed: Jan. 29, 2002

(65) Prior Publication Data

US 2003/0098073 A1 May 29, 2003

Related U.S. Application Data

(60) Provisional application No. 60/334,232, filed on Nov. 29, 2001.

(51) Int. Cl.[7] .............................................. F16K 37/00
(52) U.S. Cl. ....................... 137/557; 137/553; 137/559; 251/63; 251/144
(58) Field of Search ........................... 251/62, 63, 144, 251/324; 137/553, 557, 559

(56) References Cited

U.S. PATENT DOCUMENTS

| | | | | |
|---|---|---|---|---|
| 3,392,956 A | * | 7/1968 | De Frees | 251/144 |
| 3,857,277 A | * | 12/1974 | Moore | 73/861.74 |
| 4,009,862 A | * | 3/1977 | DeFrees | 251/63 |
| 4,327,768 A | * | 5/1982 | Behle | 251/144 |
| 4,934,403 A | * | 6/1990 | Mooney et al. | 137/315 |
| 5,235,324 A | * | 8/1993 | Gagnebin | 340/626 |
| 5,238,022 A | * | 8/1993 | Zink | 137/554 |

* cited by examiner

Primary Examiner—A. Michael Chambers
(74) Attorney, Agent, or Firm—Frank J. Uxa; Greg S. Hollrigel; Stout, Uxa, Buyan & Mullins, LLP

(57) ABSTRACT

A shutoff valve includes a positive position indicator for indicating the position of a piston in the valve. The valve position indicator is operably connected to a piston within the valve so that movement of the piston causes a corresponding movement of the valve position indicator. The shutoff valve may also include one or more springs acting on the piston to close the valve. Each spring is independently capable of closing the valve.

21 Claims, 6 Drawing Sheets

SHUTOFF VALVE AND RELATED METHODS

This application claims the benefit of U.S. Provisional Application No. 60/334,232, filed Nov. 29, 2001, the entire contents of which are hereby incorporated by reference.

The present invention relates to an apparatus and methods for controlling flow of material, and in particular, to a shutoff valve for controlling flow of fluid, such as gas or liquid, from, or to, tanks and/or through piping.

BACKGROUND OF THE INVENTION

Conventional shutoff valves, such as emergency shutoff valves, may be inserted in the side of a storage tank containing a material, such as a liquid, or in the piping used to direct the flow of the material. Shutoff valves may be used to control the flow of material from, or to, the tank, or the flow of material within the piping.

Conventional valves are actuated by hydraulic pressure, which pushes a main piston away from an opening to open the valve. Removing the hydraulic pressure causes the valve to close by the action of a single spring acting on the main piston, thereby preventing unwanted flow of material from the tank, or through the pipe. Conventionally, the valve is controlled by one or more fuse plugs. In an emergency, such as a fire, one or more of the fuse plugs in the actuating line melts, and causes a release of hydraulic pressure, and the shutting of the valve.

Conventional shutoff valves typically rely on an external hydraulic pressure meter to determine if the valve is open or closed. However, conventional shutoff valves may suffer because the hydraulic pressure meter is not always installed, and thus, the hydraulic pressure, and valve position cannot be readily determined; the hydraulic pressure meter is prone to be inaccurate; and/or the meter does not work. In addition, an operator cannot really determine the true position of the piston in the valve. For example, the piston may become stuck or otherwise immobilized, such as by the failure of the one spring acting on the main piston, and the hydraulic meter may still reflect a decrease in hydraulic pressure in the line, but would not be able to indicate that the piston in the valve is stuck.

Thus, there remains a need for an improved shutoff valve that provides a reliable indication of the shutoff valve position.

SUMMARY OF THE INVENTION

In accordance with the present invention, a shutoff valve having a positive position indicator is disclosed. The shutoff valve may be mounted in a storage tank, or in-line. The shutoff valve provides a reliable and convenient indication of the valve position. The shutoff valve provides the true position of a piston within the valve regardless of hydraulic pressure.

A shutoff valve for controlling the flow of fluid in a tank or pipe may comprise a base having two or more apertures for permitting the flow of fluid through the valve; a piston slidably disposed within the base; and a valve position indicator coupled to the piston. The piston is structured to prevent flow of fluid through the apertures when the valve is closed. The indicator of the shutoff valve of the present invention may provide the true valve position of the shutoff valve. The valve position indicator indicates the position of the piston independent of hydraulic pressure.

The valve position indicator may be physically connected to the piston or physically connected to the plunger, and may operate independently of external power sources. The valve position indicator may comprise one or more visible markers that indicate the position of the piston of the valve. For example, the valve position indicator may have a plurality of magnets that move as the piston of the valve moves. The magnets of the valve position indicator may be provided in a sealed chamber.

The shutoff valve may also include a plunger acting on the piston to cause the piston to move the piston into an open state permitting fluid to flow through the apertures of the valve. The plunger may be actuated by hydraulic fluid pressure acting on the plunger.

The shutoff valve may also include one or more springs that move the piston into a closed state to prevent the flow of fluid through the apertures. In certain embodiments, the shutoff valve may include two or more springs.

The piston of the foregoing valve may also include one or more holes permitting fluid to pass to either side of the piston to reduce or eliminate pressure differences on the piston caused by the fluid.

The base of the shutoff valve may be generally cylindrical, and may have a flange extending around the perimeter. The shutoff valve may also include a piston sleeve engageable with the base, and disposed around the piston.

Any feature or combination of features described herein are included within the scope of the present invention provided that the features included in any such combination are not mutually inconsistent as will be apparent from the context, this specification, and the knowledge of one of ordinary skill in the art.

Additional advantages and aspects of the present invention are apparent in the following detailed description and claims.

DETAILED DESCRIPTION

Figure 1:
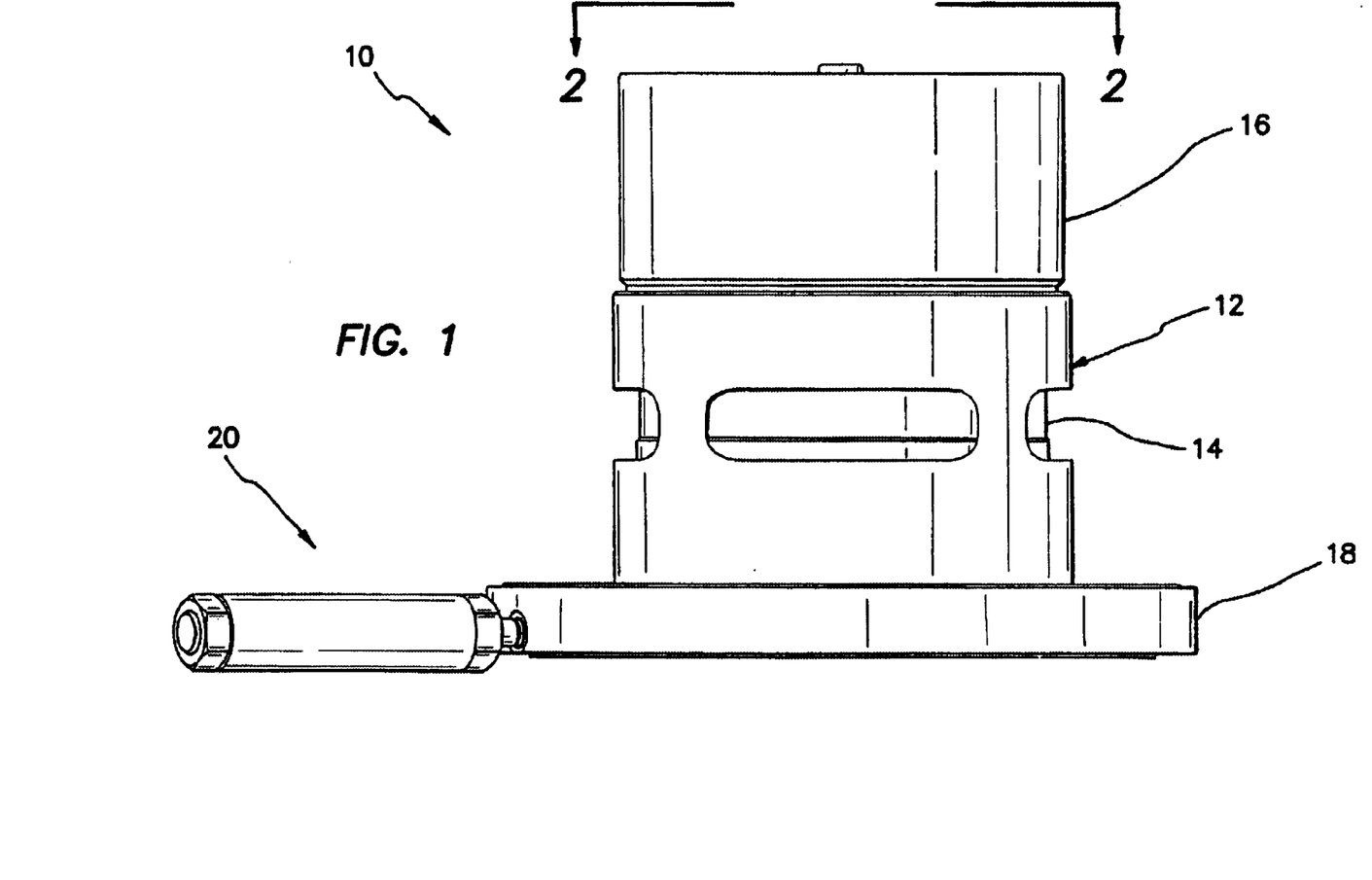
FIG. 1 is a side, plan view of a shutoff valve in accordance with the present invention.

Referring to the figures, and in particular FIG. 1, a shutoff valve in accordance with the present invention is disclosed. Shutoff valve 10 generally includes a base 12, a piston 14, a piston sleeve 16, and a valve position indicator 20. Base 12 may have a generally hollow body, and in one embodiment, is generally cylindrical. The base may have a flange 18 to help position and secure the shutoff valve in the structure (e.g., a tank or pipe) in which it is positioned. As shown in FIG. 1, and as described more fully herein, piston 14 is structured to fit within base 12. Piston 14 is slidable within base 12 and piston sleeve 16. Valve position indicator 20 is illustrated extending from flange 18, however, valve position indicator 20 may also be attached to shutoff valve 10 at a different location so long as valve position indicator can indicate the position of piston 14.

Figure 2:
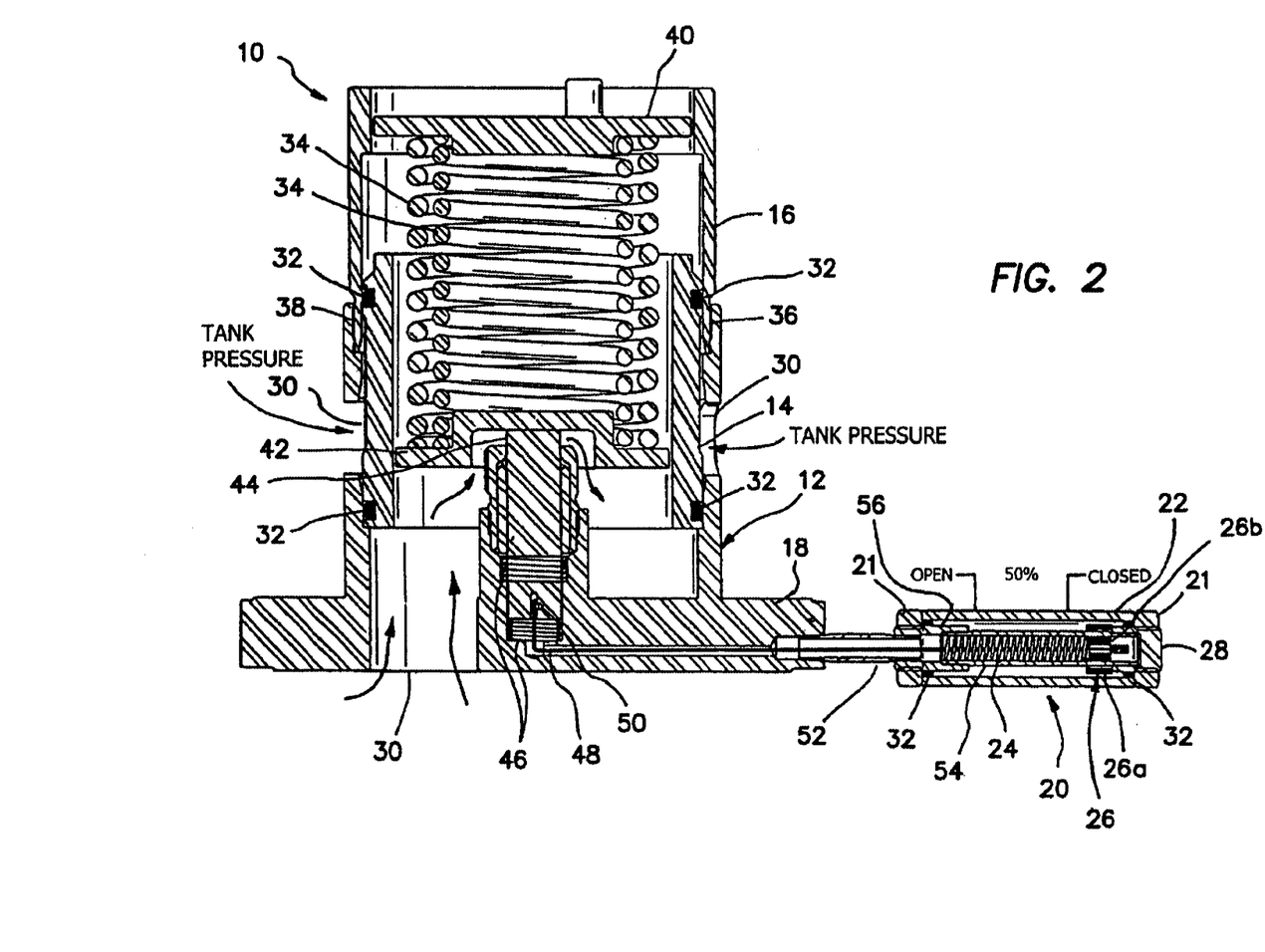
FIG. 2 is a sectional view along line 2—2 of FIG. 1.

As shown in FIG. 2, piston 14 having a base portion 42 is positioned within the hollow body of base 12. Base portion 42 may include one or more apertures (not shown) to balance the pressure on either side of base portion 42. For example, fluid flowing from a line through aperture 30 illustrated at the bottom of shutoff valve 10 in FIG. 2, will be able to pass through base portion 42, and thereby reduce the pressure that may be exerted on piston 14 by fluid in the line, such as the line pressure. In certain embodiments of the invention, the pressure on either side of piston 14 will be approximately equal. Piston 14 slides or moves within base 12 to open and close the valve. The valve in FIG. 2 is in a closed state. As illustrated, piston 14 has been urged downward so that it covers, or otherwise prevents fluid from flowing through, apertures 30 in the sidewall of base 12, as discussed herein.

Figure 6:
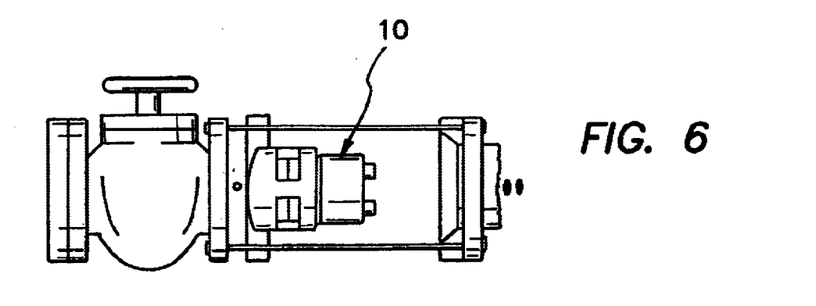
FIG. 6 is a partial sectional view of a shutoff valve in accordance with the present invention illustrating the valve positioned in-line with a filling and discharge installation.
Figure 7:
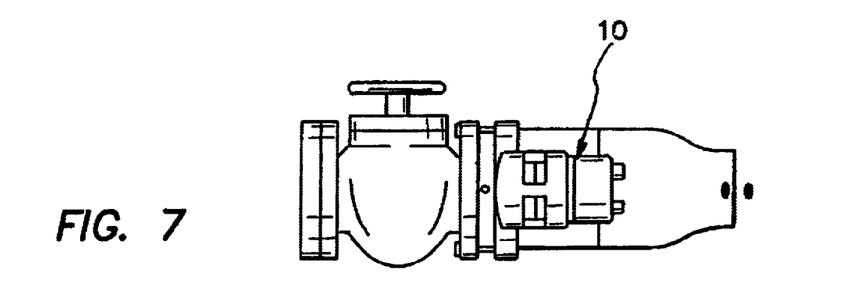
FIG. 7 is a partial sectional view similar to FIG. 6, but illustrating the shutoff valve in use with a pipe reducer.
Figure 8:
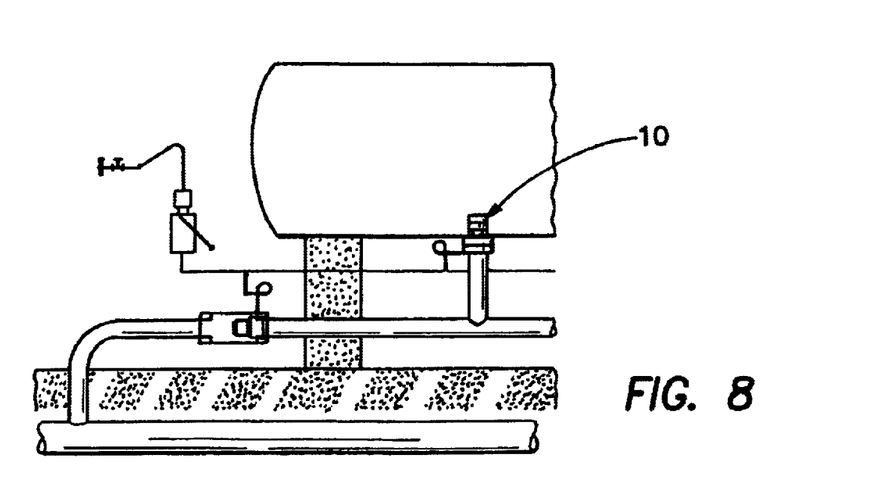
FIG. 8 is a partial sectional view of a shutoff valve in accordance with the present invention positioned in a storage tank.

The body of base 12 and sleeve 16 are configured to be inserted within a storage tank or pipe containing fluid, such as a liquid or gas (see, for example, FIGS. 6–8). The body of base 12 includes two or more apertures 30 to permit the fluid in the tank or the pipe to flow through the valve. In the illustrated embodiment, two apertures 30 are provided in the sidewalls of base 12 approximately 180 degrees apart, and one aperture 30 is provided at the bottom of base 12. The shutoff valve 10 preferably includes at least one aperture 30 on one side of the piston, and at least one aperture 30 on the other side of the piston, so that as the piston moves within the body of base 12, flow of fluid through the valve may be controlled. Piston 14 is preferably fit to the interior of base 12 so that fluid may not flow between the sides of the piston and the base. In one embodiment, piston 14 may be sealed within base 12 by providing one or more gaskets 32. Gaskets 32 may be made of any suitable material to resist flow of material along the sides of the piston and base. For example, gaskets 32 may be made of Teflon®, rubber, or plastic, as is understood by persons skilled in the art. In one embodiment, gaskets 32 are Teflon O-rings. Accordingly, piston 14 is structured to prevent the flow of fluid through apertures 30 when the valve is closed.

Sleeve 16 is illustrated positioned around piston 14 and is engageable with base 12. As illustrated, sleeve 16 includes one or more locking portions 36 for engaging with base 12. In the illustrated embodiment, locking portions 36 are inserted into groove 38 created between piston 14 and base 12. After insertion of sleeve 16, sleeve 16 is fixed to base 12 and thereby creates a closed chamber. Sleeve 16 has a top portion 40 fixed to the sidewalls of sleeve 16. In one embodiment, top portion 40 may be integrally formed with the sidewalls of sleeve 16. In addition, although the illustrated embodiment of the invention depicts base 12 and sleeve 16 as two distinct components, base 12 and sleeve 16 could be provided as a single integral unit. Furthermore, apertures 30 in the sidewall of base 12 could be positioned closer to the top of the valve so long as movement of the piston permits or prevents the flow of fluid through the apertures, as desired.

The actions of piston 14 may be controlled by one or more springs 34 disposed between the piston and piston sleeve 16. In one embodiment, each spring is strong enough to close the valve in the event that one of the springs fails to operate properly. For example, each spring 34 is strong enough to overcome the reduced hydraulic pressure acting on piston 14, so that each of the springs can close the valve by counteracting the hydraulic pressure. As discussed above, when the hydraulic pressure in the actuating line is reduced, for example, by heat causing the release of one or more fusible plugs provided in an actuating line, as discussed herein, the springs 34 act to close the valve. In the illustrated embodiment, piston 14 is controlled by springs 34 acting on the top portion 40 of sleeve 16 and the bottom portion 42 of piston 14. In the illustrated embodiment, springs 34 act to urge piston 14 downwards (e.g., away from top portion 40 of sleeve 16) and close the valve by blocking flow of material through apertures 30. Providing a plurality of springs 34 reduces the potential that the valve may become stuck in an open state due to failure of one of the springs. As discussed above, conventional valves typically utilize one spring that may fail to overpower the reduced hydraulic pressure and close the valve.

Piston base portion 42 acts on plunger 44 disposed within base 12. Plunger 44 is slidably disposed within base 12. Movement of plunger 44 is also influenced by one or more springs 46. Movement of plunger 44 may also be influenced by hydraulic pressure, as discussed herein.

The shutoff valve of FIG. 2 depicts a solid or physical link 48, such as a wire, extending from plunger 44 to valve position indicator 20. Link 48 may be secured to plunger 44 by way of one or more screws 50. Link 48 extends through base 12 to indicator 20.

Valve position indicator 20 may have an elongate body. The valve position indicator 20 may have a generally tubular or cylindrical body 22. The body 22 may be made of a clear material, such as a clear plastic, to permit an operator to see into the body. Within body 22, a valve position indicator spring 24 may be disposed around link 48 and generally extends along the length of body 22. Spring 24 is disposed inside a hollow body or pipe 54. Pipe 54 may be made of stainless steel or any other non-magnetic material. Pipe 54 is fixed in body 22 by engaging with cap 28 at the distal end of the valve position indicator 20 (e.g., the end positioned away from base 12) and engaging with a sleeve 56 at its proximal end. In one embodiment, pipe 54 is threadedly engaged with cap 28 and sleeve 56. One or magnets 26 are provided around link 48, as shown in FIG. 2. In one embodiment, an external magnet 26A is disposed around pipe 54, and an internal magnet 26B is provided within pipe 54 around link 48. Valve position indicator 20 may also include a plurality of adjustable nuts or bolts 21 at the proximal and distal ends of the indicator. Indicator 20 may also include a plurality of gaskets 32 disposed within body 22 to prevent leakage of material from the body. Indicator 20 may also include a connecting pipe 52 at the proximal end of indicator 20. Connecting pipe 52 may act as an oil inlet. Alternatively, an inlet may be provided through cap 28 and valve position indicator 20.

Figure 4:
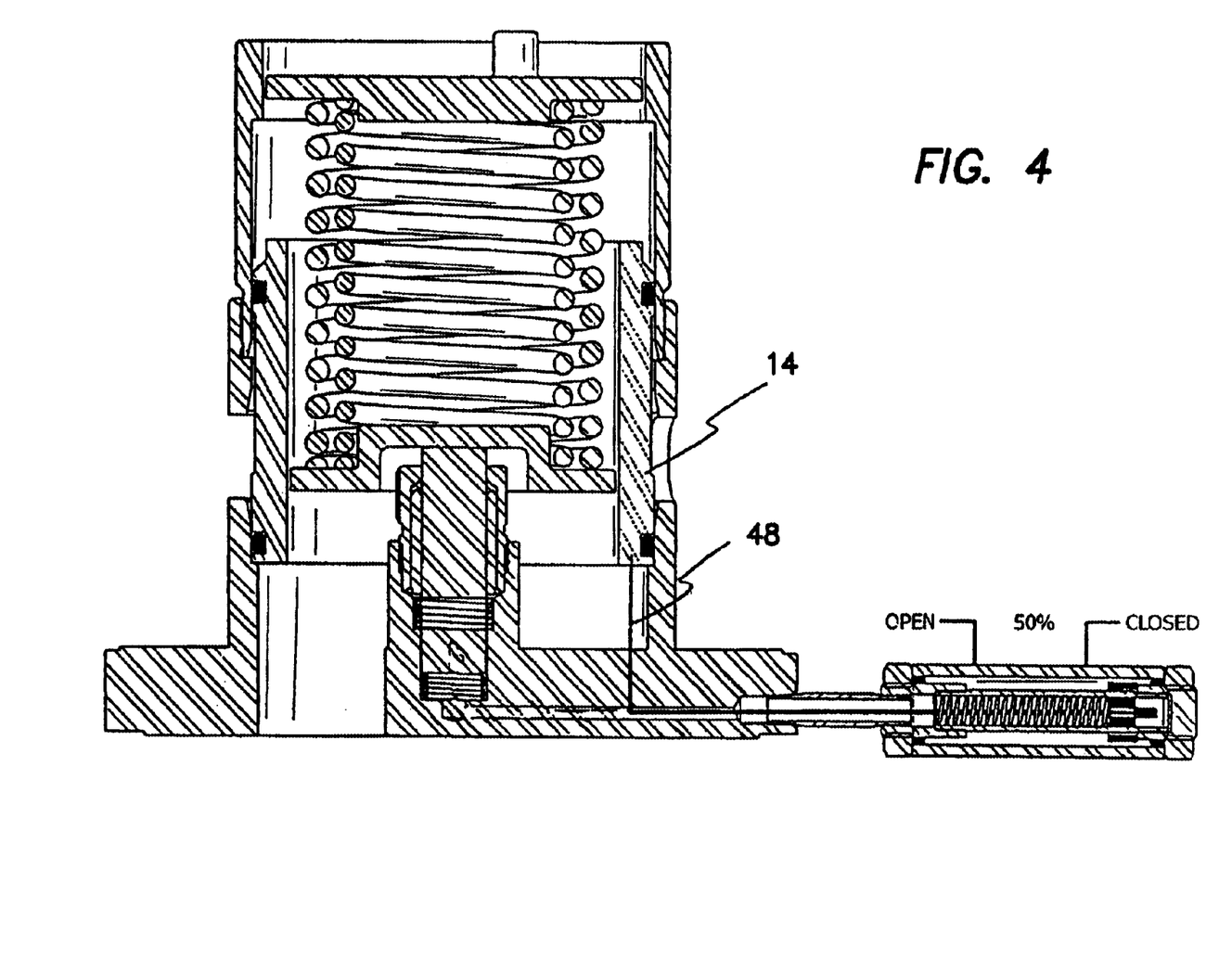
FIG. 4 is a sectional view similar to FIG. 2, but illustrating another shutoff valve in accordance with the present invention.

Because piston 14 is connected to valve position indicator 20 by way of link 48, movement of piston 14 results in a corresponding movement of magnets 26 of indicator 20. In one embodiment of the invention, piston 14 is physically connected, or directly connected, to valve position indicator 20 (e.g., see FIG. 4). In another embodiment, plunger 44 is physically connected to valve position indicator 20 (e.g., see FIG. 2). In such an embodiment, the physical arrangement of plunger 44 and piston 14 permits piston 14 to act as if it were physically connected to valve position indicator 20. For example, the movement of piston 14 of valve 10 results in a corresponding movement of internal magnet 26B. Movement of internal magnet 26B causes a corresponding movement of external magnet 26A. Because external magnet 26A may be viewed through the clear body 22, an operator can readily see the position of external magnet 26A. Accordingly, the position of magnets 26 provides an indication of the position of the piston 14 of the valve. The body 22 of indicator 20 may include one or more reference indicia to indicate the physical position of the shutoff valve. For example, body 22 may include an identifier for "open", "closed", and/or "50% open". The indicia may be calibrated to the particular position of piston 14 in the manufacture of the device. Thus, an operator may easily determine whether the shutoff valve is partially opened, fully opened, or closed. In the illustrated embodiment shown in FIG. 2, external magnet 26A is shown at a distal position with respect to the "closed" indicia. This distal position is indicative of a problem position for piston 14. For example, if link 48 were to break, magnets 26A and 26B would be urged past the "closed" mark due to the actions of spring 24 urging the magnets toward the distal end. If the marker of the valve position indicator 20 is positioned beyond the "closed" mark, the operator may then be able to determine that there is a problem in the valve, and can perform the necessary steps to address or resolve the problem.

In another embodiment of the invention, a different marker may be used to achieve the desired indicating capabilities of the valve position indicator 20. For example, link 48 could extend through body 22 and through cap 28 to provide an end of the link that extends out of the valve position indicator. The position of the end of the link may also be used to determine the state of the valve, and the position of the piston.

Figure 3:
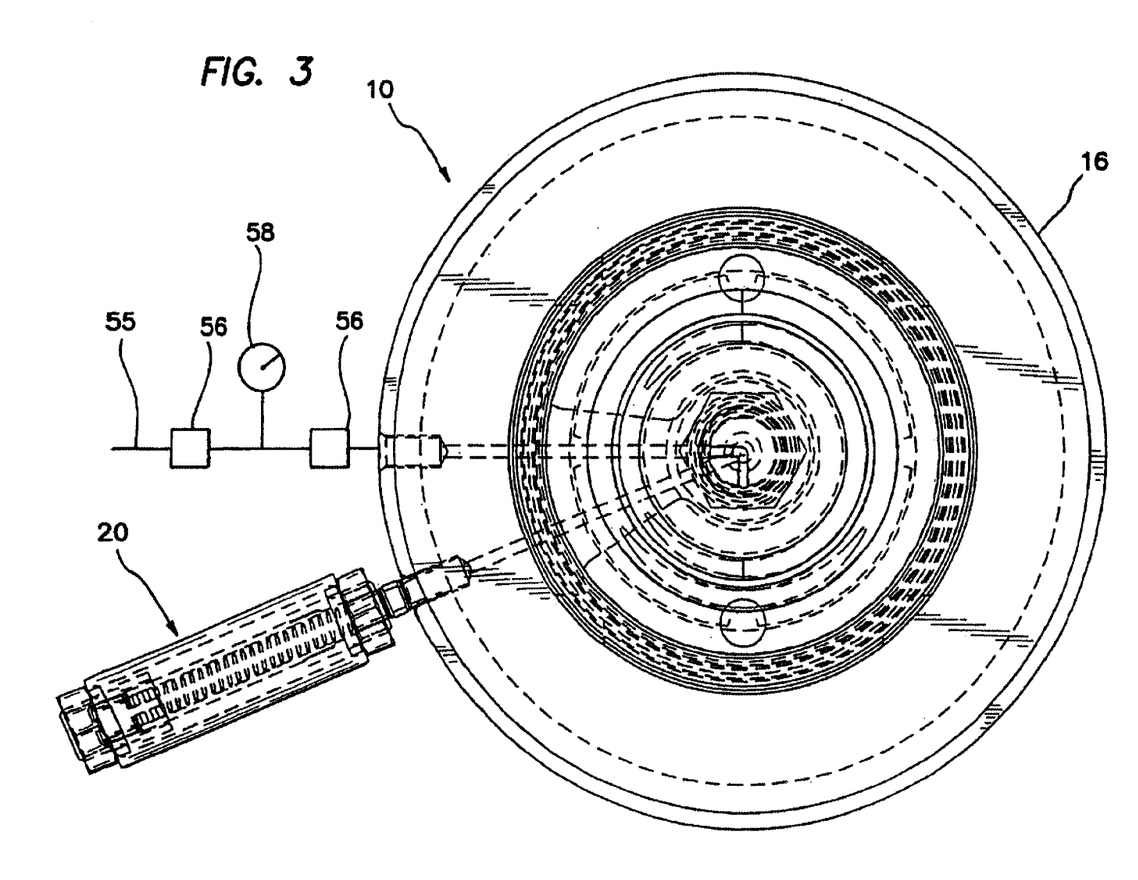
FIG. 3 is a top, plan view of the shutoff valve of FIG. 1.

A top view of shutoff valve 10 is shown in FIG. 3. As mentioned above, shutoff valve 10 may include an actuating line 55 operably connected to a hydraulic pressure source. The hydraulic pressure caused by fluid flowing through actuating line 55 may act to open and/or close the valve. For example, hydraulic pressure may be applied to the plunger 44 by way of actuating line 54. The hydraulic pressure will then act on the plunger 44, and urge the plunger 44 upward against the piston 14 and the action of springs 34. Maintaining the hydraulic pressure keeps the valve in an open state. The hydraulic pressure should be provided at a pressure that exceeds the force or pressure caused by springs 34. One or more fusible plugs 56 may be provided along actuating line 55. Fusible plugs 56 may be provided so that they release at a predetermined temperature, for example in the case of a fire. The release of the fusible plugs will result in an immediate reduction in hydraulic pressure arid the closure of the shutoff valve, e.g., by the actions of springs 34. In other words, as the hydraulic pressure decreases, the pressure exerted by springs 34 will be greater than the hydraulic pressure, and springs 34 will move the piston so the valve is closed. In the event that one of the springs fails to operate properly, the second spring is sufficiently strong to close the valve. A meter 58 may also be provided to monitor hydraulic pressure. In other embodiments of the invention, the quick shutoff of the valve of the invention may be obtained by providing one or more frangible elements which can be quickly snapped off by hand, a quick manual release on the hydraulic operating fluid source, a fail-safe pneumatic operator for remote valve closure, or a remote controlled solenoid valve.

The present invention departs from conventional shutoff valves because the hydraulic pressure actuator line, and in particular, the hydraulic pressure meter, is not required to determine the valve position. As indicated above, the shutoff valve of the present invention utilizes valve position indicator 20, which reflects the true position of the valve, or more particularly, the piston 14 in the valve, independently of hydraulic pressure. Accordingly, although hydraulic pressure may be used to open the valve, determination of the valve position does not depend on the installation and functioning of the hydraulic pressure meter installed in the actuating line. Thus, the shutoff valve disclosed herein enables one to reliably and accurately determine the state of the valve. The plurality of springs provided in the shutoff valve may each be strong enough to overcome hydraulic pressure acting on the piston of the valve. The shutoff valve of the present invention accordingly overcomes the shortcomings of conventional shutoff valves by providing means for determining true valve position and means for closing the valve if a problem in hydraulic actuation were to occur.

Figures 5A, 5B:
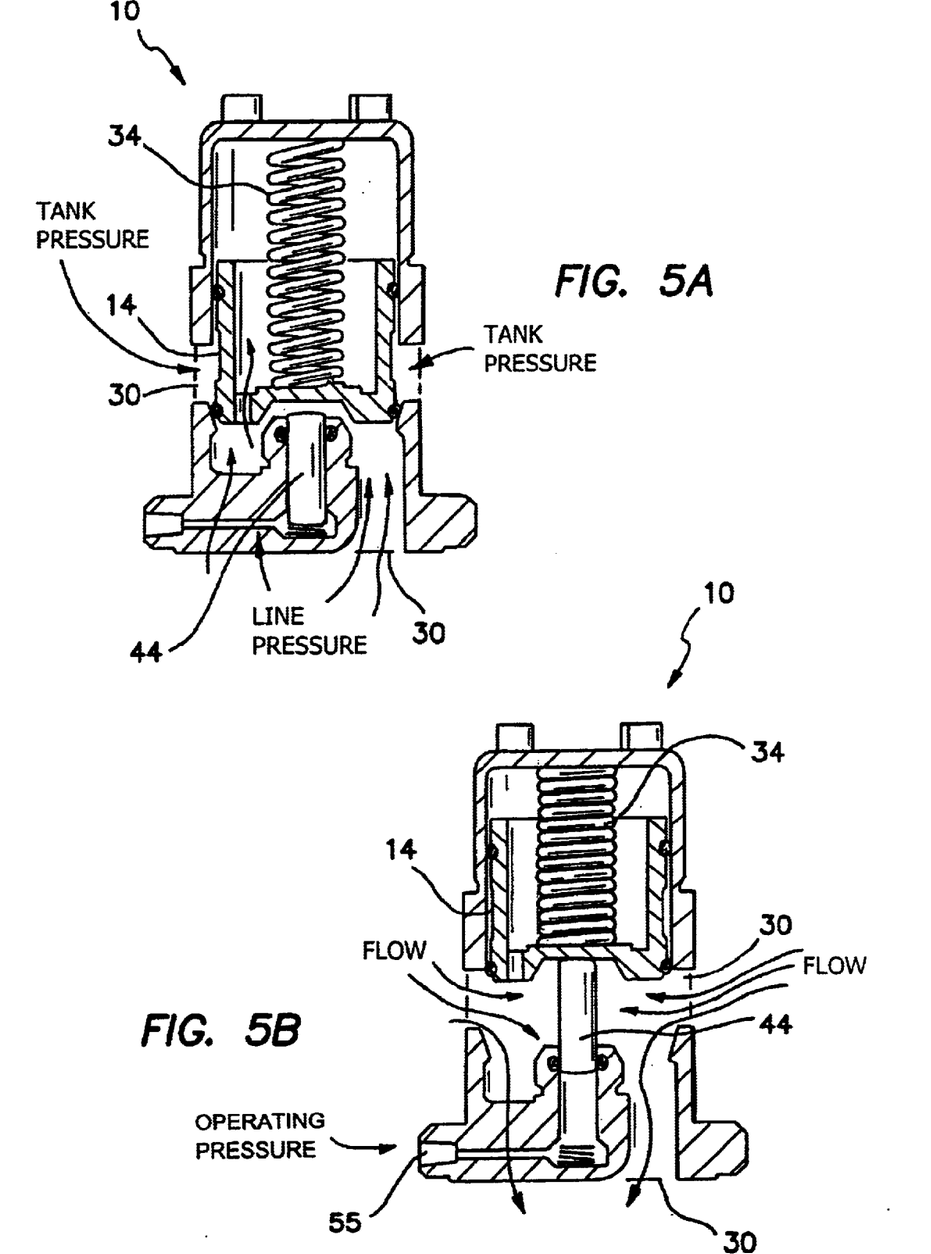
FIG. 5A is a sectional view of a shutoff valve in accordance with the present invention illustrating the valve in a closed state.
FIG. 5B is a sectional view similar to FIG. 5A, but illustrating the valve in an open state.

FIG. 5A shows shutoff valve 10 in a closed state. Spring 34 is urging piston 14 downward so that piston 14 blocks apertures 30 and prevents flow of material from a line to a tank. FIG. 5B shows shutoff valve 10 in an open state. Spring 34 has been compressed, for example, by way of hydraulic pressure through actuator line 54 acting on plunger 44, so that piston 14 is urged upward and apertures 30 are uncovered.

FIGS. 6–8 illustrate the use of shutoff valve 10 in-line (FIGS. 6 and 7) or in a storage tank (FIG. 8).

The shutoff valve of the present invention provides bi-directional flow of fluid and pressure actions useful in manifold lines and storage tanks that are capable of containing industrial fluid. The piston of the shutoff valve resists opening due to tank or line pressure. This is at least in part due to the holes provided in the base portion of the piston to balance the pressure on either side of the piston. The valve may be closed or opened by the spring-loaded piston and seat ring assembly. When operating pressure is removed, for example by reducing the hydraulic pressure in actuating line 55, the valve closes.

The shutoff valve of the present invention is preferably insensitive to pressure conditions provided by the material in the tank or piping, and the configuration of the shutoff valve may provide ideal wiping and bearing action. The shutoff valve preferably provides continuous positive indications of the valve position by the physically attached valve position indicator.

In one embodiment of the invention, the valve may be used for controlling flow of materials such as LP-GAS, anhydrous ammonia, or other similar materials. If different materials are used, the construction materials of the valve may be adjusted accordingly.

The shutoff valve of the present invention may be capable of operating at pressures between 250 and 1000 gauge pressure (psig); however, it may also be possible to operate at pressures greater than 1000 psig. In addition, the shutoff valve may be capable of handling hydraulic burst pressures of about 1500 psig.

In certain embodiments of the invention, the components of the shutoff valve may be made from steel, including, but not limited to, stainless steel, and/or aluminum.

In accordance with the foregoing description, a method of determining the position of a valve for controlling fluid flow in a tank or pipe comprises steps of providing a shutoff valve in a tank or pipe, in which the shutoff valve has a slidable piston capable of creating an open and closed state of the valve, and has a valve position indicator coupled to the piston; viewing the valve position indicator that indicates the position of the piston in the shutoff valve independently of hydraulic pressure acting on the piston; and comparing the position of a moveable marker of the valve position indicator to indicia provided on the valve position indicator. When the marker is aligned with an index reflecting the open state, the valve is open. When the marker is aligned with an index reflecting the closed state, the valve is closed.

While this invention has been described with respect to various specific examples and embodiments, it is to be understood that the invention is not limited thereto and other embodiments are within the scope of the invention.

What is claimed is:

1. A shutoff valve for controlling the flow of fluid between an actuating line and a tank or pipe, comprising:
    a base having at least one first aperture communicating with the actuating line and at least one second aperture communicating with the tank or pipe;
    a piston slidably disposed within the base and structured to prevent flow of fluid between the at least one first aperture and the at least one second aperture when the valve is closed; and
    a valve position indicator coupled to the piston, for indicating the position of the piston independent of hydraulic pressure.

2. The shutoff valve of claim 1, wherein the valve position indicator is directly physically linked to the piston.

3. The shutoff valve of claim 1, further comprising a plunger in contact with the piston, the plunger moving the piston to permit the flow of fluid through the at least one first aperature and the at least one second aperture.

4. The shutoff valve of claim 3, wherein the valve position indicator is directly physically linked to the plunger.

5. The shutoff valve of claim 1, further comprising at least one spring structured to move the piston to prevent the flow of fluid through the at least one first aperature and the at least one second aperture.

6. The shutoff valve of claim 5, comprising a plurality of springs.

7. The shutoff valve of claim 1, further comprising
    a plunger acting on the piston by hydraulic pressure, the hydraulic pressure moving the piston to permit the flow of fluid through the at least one first aperature and the at least one second aperture.; and
    at least one spring to move the piston to prevent the flow of fluid through the at least one first aperature and the at least one second aperture, the at least one spring structured to overcome the hydraulic pressure on the plunger.

8. The shutoff valve of claim 1, wherein the valve position indicator operates independently of external power sources.

9. The shutoff valve of claim 1, wherein the valve position indicator comprises a sealed chamber having a plurality of magnets disposed therein to move as the piston moves.

10. The shutoff valve of claim 1, wherein the piston has one or more holes allowing fluid to pass to either side of the piston to reduce pressure on the piston caused by the fluid.

11. A shutoff valve for controlling the flow of fluid between an actuating line and a tank or pipe, comprising a generally cylindrical base having a flange extending around the perimeter of the base, the base including at least one first aperture communicating with the actuating line and at least one second aperture communicating with the tank or pipe;
    a piston slidably disposed in the base to create an open state of the valve allowing fluid flow between the at least first aperture and the at least one second aperture, arid a closed state of the valve preventing fluid flow between the at least first aperture and the at least one second aperture;
    a plunger disposed in the base and acting on the piston to cause the piston to slide into the open state; and
    a valve position indicator coupled to the piston, the valve position indicator comprising a movable visible marker that changes position as the piston slides between the open and closed states.

12. The shutoff valve of claim 11, further comprising at least one spring contacting the piston to urge the piston into the closed state.

13. The shutoff valve of claim 11, wherein the visible marker is a magnet.

14. The shutoff valve of claim 11, wherein the valve position indicator is directly physically linked to the plunger.

15. The shutoff valve of claim 11, wherein the valve position indicator is directly physically linked to the piston.

16. A shutoff valve for controlling the flow of fluid in & tank or pipe, comprising:
    a base;
    a piston disposed in the base and moveable into an open state by hydraulic pressure acting on the piston;
    a piston sleeve connected to the base and disposed over the piston;
    at least one spring disposed between the piston and the piston sleeve, the at least one spring structured to overcome the hydraulic pressure and move the piston into a closed state; and
    a valve position indicator movable with the piston and structured to accurately indicate the open or closed state of the valve even in the event of spring malfunction.

17. The shutoff valve of claim 16, further comprising a plunger in contact with the piston and positioned to receive hydraulic pressure and to move the piston into the open state.

18. The shutoff valve of claim 17, wherein the valve position indicator is directly physically linked to the plunger.

19. The shutoff valve of claim 18, wherein the valve position indicator operates independently of external power sources.

20. The shutoff valve of claim 16, wherein the valve position indicator is directly physically linked to the piston.

21. A shutoff valve for controlling the flow of fluid in a tank or pipe, comprising
    a base;
    a piston sleeve engageable with the base to create a closed chamber;
    a piston slidably disposed in the base and in the piston sleeve;
    a plunger disposed in the base and acting on the piston to cause the piston to slide into an open position;
    a plurality of springs contacting the piston and the piston sleeve to counteract the actions of the plunger on the piston to cause the piston to slide into a closed position; and
    a valve position indicator physically coupled to the piston, wherein the valve position indicator comprises a unitary solid link between the plunger and a movable visible marker that changes position as the piston slides between open and closed positions.

* * * * *